July 15, 1969    D. H. JOSLIN    3,456,179
METHODS AND APPARATUS FOR CONTROLLING DOUGH MIXING MACHINES
Filed July 25, 1966    2 Sheets-Sheet 1
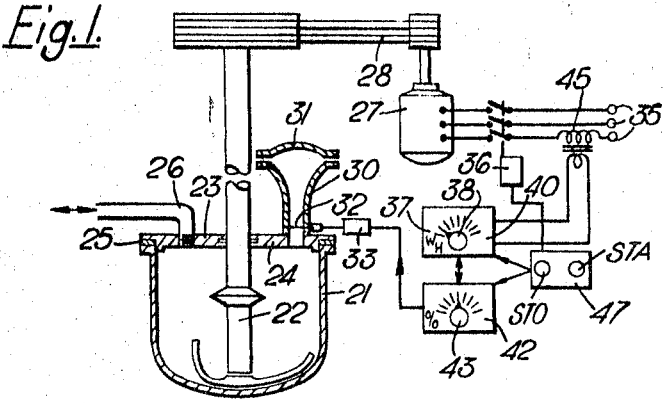
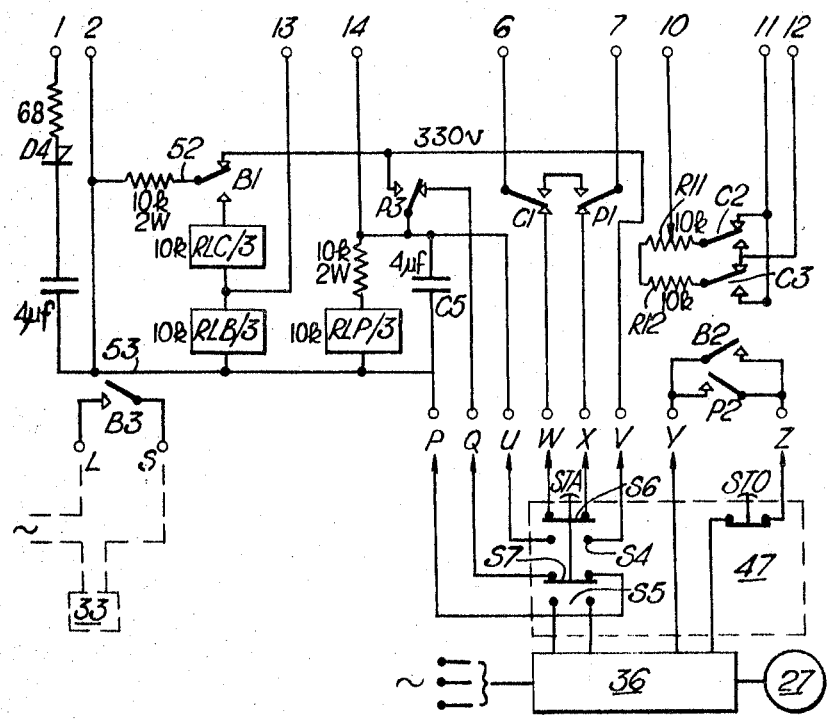

July 15, 1969  D. H. JOSLIN  3,456,179
METHODS AND APPARATUS FOR CONTROLLING DOUGH MIXING MACHINES
Filed July 25, 1966  2 Sheets-Sheet 2
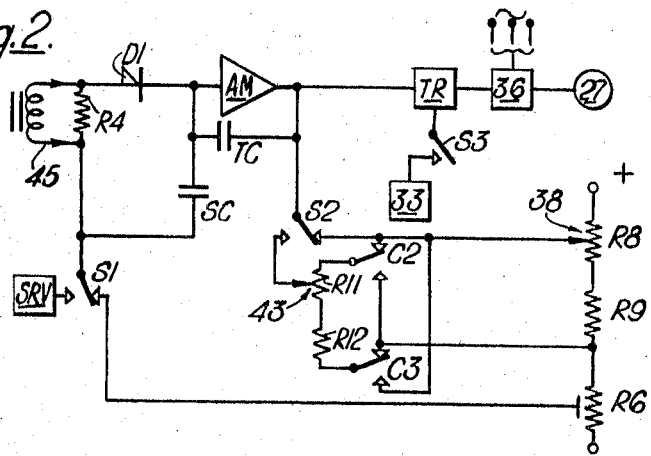
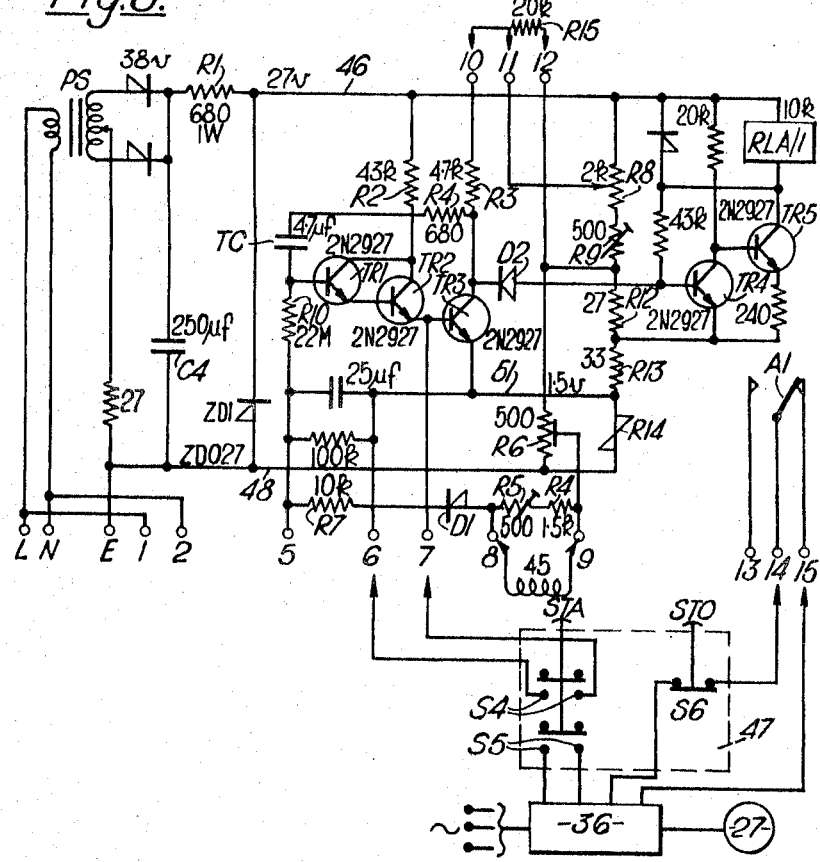
Inventor
Douglas Hector Joslin
Watson, Cole, Grindle + Watson
Attorneys

# United States Patent Office 3,456,179
Patented July 15, 1969

3,456,179
METHODS AND APPARATUS FOR CONTROLLING DOUGH MIXING MACHINES
Douglas H. Joslin, 23 Heathhurst Road,
Sanderstead, Surrey, England
Filed July 25, 1966, Ser. No. 567,449
Claims priority, application Great Britain, Aug. 3, 1965, 33,075/65
Int. Cl. H02p 1/04, 3/02
U.S. Cl. 318—484                    10 Claims

ABSTRACT OF THE DISCLOSURE

A control device for a mixing machine is disclosed wherein a predetermined control voltage is applied to a capacitor in an electronic circuit after which current is continuously applied to the capacitor to progessively change the voltage across the capacitor while the mixer is in operation. Upon a predetermined second voltage being reached, a trigger circuit shuts off the mixer. The continuously applied current may be from a source providing a constant voltage or from a source where the voltage is determined by and is directly proportional to current consumed by the mixer motor.

---

The present invention relates to an improved control device for stirring or mixing machines where a substance or a mixture is subjected to a mechanical action, such as stirring, agitating or mixing, in a vessel by means of a power driven member, and the object of the invention is to provide a simple and effective conrtol for terminating the performed operation under the control of preset means on the control device.

A further object of the invention is to provide an automatic control operative in two steps in which the point of termination of the first step and the commencement of the second step represents a selected predetermined fraction of the whole operation for example represented as a percentage of the total preselected on a main control.

The present invention may be applied to an automatic timing control where the regulating factor is a time period, or, in accordance with a further important feature of the invention, the control may be integrated with the energy consumption during the mixing operation. In this aspect of the invention presetting of a main control may be selected on the basis of the weight of the mix being dealt with and according to the energy consumption required to ensure proper treatment of the one or more components being dealt with.

A particular field of application of the present invention is in the mixing of dough products for use in the bakery trade in which field it has been discovered that the mechanical action involved represents an essential factor in the production of acceptable final products, and in this field the application of suitable mechanical treatments results mainly in the accelerated development of the gluten structure of the flour. It has been realised recently that, in bread-making for example, proper development is related to the amount of mechanical energy imparted to a given mass of ingredients being mixed, and thus that the correct operation of the mechanical development of the properties of the mix is related to the amount of energy imparted to the ingredients.

The present invention is thus directed by way of specific example to a method and means for controlling mixing machinery for dough products and the like in which control of the mixing operation is regulated according to the amount of energy consumed during the mixing operation.

With this type of dough mixing machinery it is often required to add additional components to the mix at an intermediate stage of the mixing, this applying for example in the case where fruit is to be incorporated in the mix, and the present invention is also directed to a control system for timng the addition of such components, for example fruit.

In its broadest aspects therefore the present invention relates to a control device for mixing machines having an electronic circuit including a timing capacitor which controls a trigger circuit to terminate the mixing when a predetermined voltage appears across the capacitor and in which the circuit is "set" by circuit means imparting an adjustable predetermined voltage to the capacitor, the potential of which changes progressively during the operating phase of the machine at a rate which is either a constant rate in the case where the regulating factor is a time period, or a rate dependent on the energy, or more specifically current consumption of a driving motor, in the case where the regulating factor is the energy consumption; in either case so that the potential changes towards the predetermined voltage value, whereafter the mixing is terminated on attainment of said predetermined value.

Preferably the capacitor is disposed between the output and input terminals of an amplifier so that during the operating phase the potential of both terminals of the capacitor varies co-ordinately in the manner of a Miller integrator circuit. In the preferred arrangement the application of the predetermined voltage charge to the capacitor is effected under the control of a main control potentiometer resistor forming part of a potential divider network so that said initial charge can be accurately preset by said potentiometer resistor and the change in potential across said capacitor during a mixing operation phase is derived from a small voltage which regulates the rate of change of voltage across the capacitor.

In the case of a timing control the small voltage is a constant voltage and the main control potentiometer resistor serves as a time-expired control for obtaining various predetermined operating times of the mixing machine according to the setting of the said potentiometer resistor, whereas in the case of energy consumption control the small voltage is a voltage dependent on the current consumed by a driving motor for the mixing machine and thus inferentially dependent on the energy consumption, and the potentiometer resistor is representative of and adapted to be preset by reference to the energy consumption before mixing is to be terminated.

As applied to a control circuit for performing the mixing operation in two steps, for example in the case of a fruiting control for dough mixing machines, the second operation is arranged to occur at a predetermined percentage fraction of the whole mixing period and the main control potentiometer resistor is connected through a reversing switch to a further potentiometer resistor presettable according to the variable percentage function, which latter potentiometer controls the first stage which is terminated according to the setting of the said percentage control, after which the said reversing switch is reversed and the control circuit reset to commence the second stage operation for the residue of the mixing period determined by the first said potentiometer resistor.

The features of the present invention are illustrated by way of example on the accompanying drawings mainly as applied to a mixing machine for dough products, and in which:

FIG. 1 is a general view showing a typical mixing machine together with its power supply and a current shunting element coupled to the timing control unit and also showing a fruiting attachment for the mixing machine, together with its own control device, FIG. 2 is a block circuit diagram illustrating the operating principles of the control unit and of the fruiting attachment, FIG. 3 is a circuit diagram of the timing control unit, and FIG. 4 is a circuit diagram of the fruiting unit.

The general features of mixing equipment according to the present invention are shown on FIG. 1 of the drawings wherein a dough mixing vessel 21 incorporates a positively driven shaft 22 carrying a bladed stirrer at its lower end, part of which follows the configuration of the base of the vessel 21. The latter is closed by means of a sealing cover 23 which incorporates a sealing element 24 surrounding the shaft 22, the cover seating on a sealing ring 25. The cover may also be provided with a feed pipe 26 whereby different pressures may be made operative within the vessel 21 if this facility should be required.

The shaft 22 is driven by a three-phase motor 27 by means of a belt drive 28 indicated in diagrammatic form.

An attachment 30 is fitted to the cover 23 for the addition of other components, for example fruit, the attachment 30 being covered by a detachable cover 31, and the addition of such components or fruit to the vessel 21 is controlled by a slider member 32 operated by a solenoid or other suitable control device 33.

The motor 27 receives current from a power supply, in the present case a three-phase supply at terminals 35, and control of the motor is effected by means of a starter switch 36 operated by a main control unit including control boxes 37, 42 and 47. The box 37 has a presettable dial control 38 and the box 47 has start and stop buttons STA and STO. The control box 42 regulates the fruiting attachment by applying an operating signal to the solenoid 33. The control box 42 is provided with a presettable dial control 43 which is calibrated as a percentage dial to indicate the fraction of the total timing interval at which the fruiting attachment 30 is operated to admit fruit or additional components to the mix.

In accordance with a primary feature of the present invention the power supply includes a shunting element for the current taken by the motor 27. In the case of a DC motor this may be a resistor shunt while in the case of an AC motor a current transformer 45 is used; this feeds a voltage to the control unit 37 depending on the current consumed by the motor 27 and which for all practical purposes can be regarded as representative of the energy consumption of the motor 27. In this connection it may be assumed that in practice the motor 27 will always operate at a load ranging between, say, half load and full load, the power factor in the motor circuit will be approximately constant and any minor alterations in line voltage will not in practice have any significant influence on the correct control of the mixing operation.

FIG. 2 is a block diagram which illustrates the basic operational features of the timing control unit and of the fruiting attachment. An amplifier indicated in conventional form at AM is stabilized by negative feed back through a path including a timing capacitor TC. The output from the amplifier AM operates a trigger circuit TR which in turn controls the starter switch 36 which, as already indicated on FIG. 1, controls the starting and stopping of the motor 27. A switch $S_1$, in the alternative position to that shown, arranges for the circuit to operate as a timing unit, in which case the current transformer 45 is assumed to be inoperative and the timing circuit receives a constant voltage from a stabilised reference voltage source SRV, in the position shown in full the circuit operates dependently on the current in the motor circuit. For the latter purpose FIG. 2 also shows the secondary winding of the current transformer 45 feeding a shunt resistor or burden $R_4$ and the output is rectified by a diode $D_1$ and smoothed by a capacitor SC. In place of half wave rectification, as shown, other rectifier circuits, such as a voltage doubler circuit, can be used. With $S_1$ in the position shown the rectified output from the diode $D_1$ passes to the amplifier input and to one terminal of the timing capacitor TC. A preset potentiometer resistor $R_6$ feeds a control voltage to the diode $D_1$, the resistor $R_6$ forming part of a potential divider network including a variable main control resistor $R_8$ (control dial 38), and a fixed resistor $R_9$, all three resistors being connected between + and — D.C. terminals, as indicated.

Neglecting the fruiting attachment components indicated at $C_2$, $C_3$, $R_{11}$ and $R_{12}$ which are brought into use by the switches $S_2$ and $S_3$, the variable tapping point of the resistor $R_8$ provides a variable voltage for presetting the voltage across the timing capacitor TC at the same time that the motor 27 is started. Current from the resistor $R_6$ and from the current transformer 45 when connected as shown, controls the progressive change of voltage across the capacitor TC during operation of the motor 27 until the value is reached which causes the trigger circuit TR to stop the motor 27.

Thus, before mixing commences the timing control $R_8$ will have been preset to the required value according to the weight and character of the mix, and in this connection it is convenient and satisfactory for the control $R_8$ to be calibrated in time units for time-expired operation or either in mix-weight units or in arbitrary units for energy consumption control. When calibrated in arbitrary units its is used with a setting chart from which the setting of the control may be determined according to the weight of the mix and the character of the material being mixed.

On momentary operation of a start control (STA in FIGS. 3 and 4 of the drawings) a re-set circuit is operated which charges the timing capacitor TC to a potential dependent on the setting of the main control $R_8$. At the same time the motor is started by the start control and the potential across the timing capacitor TC is progressively changed by the current taken from the resistor $R_6$ and from the current transformer 45. As the capacitor TC is connected in a feed-back path between the output and input of the amplifier the circuit operates in the manner of a Miller integrator giving an effective value to the capacitor which is related to the actual capacitance and to the gain of the amplifier. The slope of the voltage change of the timing capacitor TC depends on the current taken from the resistor $R_6$ and the current transformer 45. When the potential across the capacitor TC has reached a predetermined level, which is the trigger level for the circuit TR, the latter is operated which in turn operates the starter switch 36 to stop the motor 27. For time-expired control switch $S_1$ is in the alternative position and the current is drawn from the standard reference voltage source SRV and the current transformer 45 is made inoperative. Current now reaches the timing capacitor through the inoperative transformer winding 45 or the resistor $R_4$.

The additional features shown on FIG. 2 in connection with the fruiting attachment will now be described. For convenience switches $S_2$ and $S_3$ are shown to enable the fruiting attachment to be brought into use, but it should be understood that these switches are shown purely for explanation purposes and are not provided on the equipment shown in FIGS. 3 and 4 for the reasons which will become apparent in connection with the description of the latter figures. With the switches $S_2$ and $S_3$ in the alternative positions the switch $S_3$ connects the solenoid 33 to a suitable point in the circuit and the switch $S_2$ provides for the setting voltage of the timing capacitor TC to be taken from the potentiometer resistor $R_{11}$ (control dial 43 in FIG. 1) which, together with the resistor $R_{12}$, is shunted across the tapping point of the main control resistor $R_8$ and the junction between the resistors $R_9$ and $R_6$, via reversing contacts $C_2$ and $C_3$. The potentiometer resistor $R_{11}$ is the fruiting attachment control resistor and is calibrated in percentage units, conveniently ranging from 50% to 100% if the resistors $R_{11}$ and $R_{12}$ are of equal value.

To control the mixing the main control resistor $R_8$ is set to a selected value representing, for example, the total energy consumption required for the mixing being undertaken and the percentage or fruiting control $R_{11}$ is set to the percentage value of the total mixing period at which fruit is to be added to the mix; and the equipment is started as already explained. The timing capacitor TC is now set to a smaller voltage than before through the action of the fruiting control $R_{11}$ which, instead of terminating the mixing operation when the trigger circuit TR is operated, operates the solenoid 33 to admit fruit to the mix and at the same time the contacts $C_2$, $C_3$ are reversed so that a new potential is applied to the timing capacitor TC representing the unexpired period $100-x\%$ where $x$ is the percentage setting of the fruiting control $R_{11}$. The timing caapcitor TC is now reset to the value now present at the tapping of the fruiting control $R_{11}$ and mixing then continues for a further period until the full period selected by the main control $R_8$ is attained. It will be seen that the effect of the changeover of the relay contact $C_2$, $C_3$ is to reverse the positions of the resistors $R_{11}$ and $R_{12}$ in relation to the resistors $R_8$ and $R_9$, and that initially a fraction only of the voltage derived from the main control resistor $R_8$ is applied to the timing capacitor TC and thereafter the difference between that value and the preselected value is applied to the timing capacitor so that the overall operating period is that selected by the main control $R_8$.

FIGS. 3 and 4 are circuit diagrams of the timing control unit and of the fruiting attachment arranged in both cases for energy consumption control. Modifications for time-expired control involve making the current transformer 45 inoperative and the provision of a standard reference voltage source SRV as in FIG. 2. The fruiting attachment is intended to be a detachable or disconnectable element which is brought into use when required. As indicated on FIG. 3 the main timing control unit incorporates a series of numbered terminals 1, 2 and 5 to 15 as well as power supply terminals L, N and E. When the fruiting attachment is not in use a switch control unit indicated within the dotted framework 47 is connected to the terminals 6, 7 and 14, 15 of the control unit, as explained more fully below. The fruiting unit is provided with a series of marked terminals 1, 2, 6, 7 and 10 to 14, which are respectively connected to the same numbered terminals of the control unit shown in FIG. 3, the switch control unit 47 being disconnected from the latter and now connected to the terminals P, Q and U to Z. Further terminals L and S are connected to a power line and to the solenoid 33.

Referring first to FIG. 3 it will be assumed that a mains supply is connected to the terminals L (live), N (neutral) and E (earth) and feed a transformer and rectifier unit PS the output of which is smoothed by a capacitor $C_4$ and the output voltage regulated by means of a zener diode $ZD_1$ which, in conjunction with the series resistor $R_1$ provides a constant voltage power supply to the main circuit lines 46, 48 for operating the transistors $TR_1$, $TR_2$, $TR_3$, $TR_4$ and $TR_5$. The earth terminal E is coupled to the line 48 and to a center tap of the supply transformer secondary winding.

Terminals 1 and 2 of the unit shown in FIG. 3 provide alternating current power supply terminals for the fruiting attachment shown in FIG. 4 as explained hereinafter. The terminal 5 is a test terminal. Terminals 6 and 7 are the re-set terminals and are connected to the start switch STA having normally open contacts $S_4$ connected to the terminals 6 and 7 and normally open contacts $S_5$ which on operation of the switch are connected to the starter switch 36 for the motor 27.

Terminals 8 and 9 are connected to the current transformer 45 while terminals 14 and 15 are coupled via the normally closed contacts $S_6$ of the stop switch STO for the motor 27. When the fruiting unit shown in FIG. 4 is in use the connections shown to the terminals 6, 7 and 14, 15 are removed and are connected to appropriate terminals of the fruiting attachment, as explained hereinafter, the fruiting attachment itself being connected to the identified terminals of that attachment and of the main control unit of FIG. 3.

In the first place, however, the main control unit, with the switch control unit 47 connected as indicated on FIG. 3 will be explained. It will be noted that the transistors $TR_1$ and $TR_2$ together form a Darlington pair which amplify the change of voltage across the timing capacitor. They have a high input impedance and a relatively high current amplification factor and the output is connected to the base of an amplifier transistor $TR_3$, the emitter of which is returned to a stablised line 51. The transistors $TR_1$ and $TR_2$ have a common collector load $R_2$ and the transistor $TR_3$ has a collector load $R_3$, and the collector is coupled to the base of the transistor $TR_1$ through a resistor $R_4$ and the timing capacitor TC, which operates as a Miller integrator capacitor. The transistors $TR_1$, $TR_2$, and $TR_3$ represent together the amplifier AM of FIG. 2.

In the following description of the main operating features of the control circuit it will be assumed in the first place that the apparatus is arranged for energy consumption control and that the fruiting attachment (FIG. 4) is not in use.

The current transformer 45 connected to the terminals 8 and 9 is shunted by the resistor $R_4$ and a preset resistor $R_5$ which together form the burden across the current transformer, to produce an output which is rectified by the diode $D_1$, which feeds through the series resistor $R_7$ a high value resistor $R_{10}$ controlling the flow of current into the timing capacitor TC at a rate dependent on the voltage taken by the tapping point of the resistor $R_6$ and the voltage developed across the burden resistors $R_4$ and $R_5$ and the fixed series resistor $R_7$ which increases the time constant of the rectifier circuit. As stated, the main control resistor $R_8$ and a fixed resistor $R_9$ (shown on FIG. 3 as a preset variable resistor) form a potential divider chain in series with the resistor $R_6$ and the junction point between the resistors $R_9$ and $R_6$ is also connected to further resistors $R_{12}$ and $R_{13}$ and a voltage dependent resistor $R_{14}$ which maintains a constant voltage on the line 51 to which the base of the amplifier transistor $TR_3$ is connected.

The resistor $R_6$ is a preset resistor and serves as a calibration control to back off the no-load motor current. Also, and in conjunction with other variable controls, e.g. $R_5$, it permits adjustment of the control to suit the dial calibrations. The transistors $TR_4$ and $TR_5$ together form a trigger circuit (TR in FIG. 2) for operating a relay RLA/1, which is connected to the collector of the amplifier transistor $TR_3$ through a diode $D_2$, the emitters of the transistors $TR_4$ and $TR_5$ being returned to the junction point between the resistors $R_{12}$ and $R_{13}$. Further load resistors and a relay quench diode are shown for the trigger circuit, but as these components are conventional in the art, no further detailed reference is made to them. The trigger circuit leaves the relay RLA/1 de-energised during the timing phase and the contact $A_1$ connects the terminals 14 and 15 to complete a circuit from the control switch 36 and the normally closed stop contacts $S_6$ of STO so that the motor 27 can operate but is stopped either by operation of STO or by energisation of relay RLA/1.

The normally open contacts $S_4$ of the start switch are connected to the reset terminals 6 and 7 so that on depression of the start switch, when the contacts $S_5$ are closed, to start the motor 27 the base of the amplifier transistor $TR_3$ is connected to the emitter so that the amplifier transistor is cut off and the collector voltage rises to that selected by the main control resistor $R_8$. This result is secured because the terminals 10, 11 and 12 are linked as shown, the terminals 10 and 11 being connected directly to transmit the voltage at the moving contact of the resistor $R_8$ to the load resistor $R_3$. The timing capacitor TC now charges rapidly through the base emitter path of the transistors $TR_1$ and $TR_2$ via the tearminal 7, contacts $S_4$ and terminal 6 to the voltage determined by the setting of the main control resistor $R_2$. The resistor $R_{15}$ disposed between the terminals 11 and 12 provides a load equivalent to the load inserted at these terminals when the fruiting attachment of FIG. 4 is in use, as explained hereinafter.

Thus it will be seen that momentary closing of the contacts $S_4$ connects the reset terminals 6 and 7 and the timing capacitor TC immediately changes to a value determined by the setting of the main control resistor $R_8$. Since this is conveniently a 2k variable potentiometer resistor, a high quality wire wound component can be used providing the conditions for reliability and accurate repeatability of results. Immediately the start control STA is released the direct connection at the re-set terminals 6, 7 between the base and emitter of the transistor $TR_3$ is removed and the base of $TR_3$ now rises slowly in potential as the potential across the timing capacitor TC changes, with a progressive fall in the collector voltage. When the collector potential of the transistor $TR_3$ reaches the trigger level the trigger circuit operates the first relay RLA/1 and the contact $A_1$ stops the motor 27.

When the fruiting attachment shown in FIG. 4 is in use the switch control unit 47 is disconnected and connected to the terminals P, Q and U to Z of the fruiting attachment, and the numbered terminals 1, 2, 6, 7 and 10 to 14 of the latter are connected to the similarly numbered terminals of the main control unit of FIG. 3, the connections, including the resistor $R_{15}$, being detached from the terminals 10, 11 and 12. It will be seen that with the relay contacts $C_2$ and $C_3$ in the position shown the fruiting control resistor $R_{11}$ is connected to the moveing contact of the resistor $R_8$ and the load resistor $R_3$ is connected to the moving contact of the resistor $R_{11}$, the resistor $R_{15}$ being thus replaced by the resistors $R_{11}$ and $R_{12}$, conveniently of equal value so that the percentage control represents 50% to 100% of the total figure selected by the main control resistor $R_8$.

In this case additional connections are shown for the start control STA including the normally closed contacts $S_6$ connected to the terminals W and X which, via the relay contacts $C_1$ and $P_1$ in the position shown, are connected to the re-set terminals 6 and 7 of the main control unit. Normally closed contacts $S_7$ are connected to the terminals P and Q.

The various features of the fruiting attachment will be apparent from the following description of the operating features thereof. With the two units connected the main control resistor $R_8$ is set for the total mixing figure and the fruiting control resistor $R_{11}$ is set to the percentage figure at which the fruit is to be added to the mix. On operation of the start switch STA the contacts $S_4$ connected to the terminals U and V provide a path for operating a relay RLP/3 (the second relay) through a relay contact $B_1$ in the position shown. The operating current is taken from D.C. supply lines 52 and 53 fed through the terminals 1 and 2 from the A.C. supply terminals L and N of the main unit and rectified by a rectifier $D_4$ and smoothed by the conventional components shown.

The contact $P_3$ changes over on operation of the relay RLP/3 and provides a holding circuit for the latter relay and the contact $P_1$ changes over so that the terminals 6 and 7 are no longer connected together and thus the timing operation is started, as already explained, allowing the timing capacitor TC to change in potential at a rate depending, on the current taken in the present example, from the current transformer 45, in combination with the setting of the resistor $R_6$. At the end of the first stage timing operation the trigger circuit TR operates the relay RLA/1 and the contact $A_1$ thereof changes over to connect the terminals 13 and 14 of the fruiting attachment. This provides an operating circuit from the line 52 for a relay RLB/3 (the third relay) through the reversed contact $P_3$. The contact $B_3$ of this relay operates the solenoid 33 to admit the fruit to the mix and the contact $B_1$ changes over and provides a holding circuit for the relay RLB/3 and operates the relay RLC/3 (the fourth relay) in series therewith. The capacitor $C_5$ ensures operation of the relay RLB/3 while the contact $B_1$ is moving between its two positions. The relay RLP/3 is still operated, being fed via RLC/3 and contact $A_1$. Thus, the contact $P_1$ remains reversed and on operation of the relay RLC/3 the contact $C_1$ completes a circuit to the terminals 6 and 7, thus resetting the main control unit. The relay RLA/1 is then released and the contact $A_1$ releases the relay RLP/3.

The operation of the relay RLC/3, however, has reversed the contacts $C_2$ and $C_3$ so that so that the new initial potential across the capacitor TC represents the residue of the period selected by the main control resistor $R_8$, as already explained, in effect by inverting the resistors $R_{11}$ and $R_{12}$. With the commencement of the second stage timing the relay RLP/3 is released and the relays RLC/3 and RLB/3 are operated through the holding contact $B_1$. At the termination of the second stage the contact $A_1$ reverses again and since the terminal 14 is connected to the main return line 53 via the contact $P_3$ in the position shown on FIG. 4, the terminal Q, the switch contacts $S_7$ and the terminal P, the relay RLB/3 is shorted to earth and thus releases, and the contact $B_1$ returns to its normal position releasing the relay RLC/3 so that the fruiting attachment has returned to its normal quiescent condition. At every point during the two timing stages either the contact $B_2$ of the relay RLB/3 or $P_2$ of the relay RLP/3 has been closed thus ensuring that the starter switch 36 keeps the motor 27 in operation. At the end of both stages, however, the contacts $B_2$ and $P_2$ are open and thus the motor 27 is stopped.

The contacts $C_2$ and $C_3$ may be replaced by additional contacts of relay RLB/3 since the latter operates at the same time as the relay RLC/3.

In FIGS. 3 and 4 various other resistors and capacitors are shown; these are provided in accordance with normal practice and perform the usual functions which will be well understood by those skilled in electronic arts. Preferred values of the various components have been indicated in conventional manner by way of example, as also have the voltages at various points, and suitable transistor types.

What I claim is:

1. A control device for mixing machines including a mixing vessel, at least one rotatable stirrer, an electric motor for driving said stirrer, a power supply to said motor and switch means connected between said power supply and motor for starting and stopping the motor, said control device comprising a capacitor, reset means connected to the capacitor for charging said capacitor to a preselected control voltage and to operate said switch means to start the motor, means to cause a continuous flow of current to said capacitor to attain a predetermined second voltage while mixing is in progress to cause a progressive change of voltage across said capacitor, and a trigger circuit operative on attainment of said second voltage across said capacitor to operate said switch means to stop the motor.

2. A control device according to claim 1, wherein said means to cause a continuous flow of current provides a constant current to the capacitor whereby the mixing machine is operated for a preselected time period through said switch means.

3. A control device according to claim 1, wherein said means to cause a continuous flow of current includes means to sense the motor load current and provide a current to the capacitor directly proportional thereto to terminate the mixing after a predetermined total energy consumption by said motor.

4. A control device according to claim 1, wherein the capacitor is disposed between the output and input terminals of an amplifier to provide an effective capacitance value related to the actual capacitance multiplied by a factor dependent on the gain of the amplifier whereby during operation of the mixer the potential of both terminals of the capacitor vary co-ordinately in the manner of a Miller integrator circuit.

5. A control device according to claim 3, wherein said sensing means comprises an impedance in the power supply of the driving motor.

6. A control device according to claim 3, wherein said sensing means comprises a transformer in the power supply of the driving motor.

7. A control device according to claim 1, wherein said reset means comprises a variable main control potentiometer resistor and a potential divider network for applying the predetermined control voltage to the capacitor whereby said control voltage can be accurately preset by said potentiometer resistor.

8. A control device according to claim 7, wherein said second voltage is a constant voltage whereby the main control potentiometer resistor serves as a time-expired control for obtaining various predetermined operating times of the mixing machine according to the setting of the said potentiometer resistor.

9. A control device according to claim 7, wherein the means to provide said second voltage provides a voltage directly proportional to the current consumed by the driving motor for the mixing machine whereby the setting of the potentiometer resistor determines the energy consumption of the drive motor before mixing is to be terminated.

10. A control device for mixing machines including a mixing vessel, at least one rotatable stirrer, an electric motor for driving said stirrer, a power supply to said motor and switch means connected between said power supply and motor for starting and stopping the motor, said control device being capable of operating said mixing vessel in two sequential stages and comprising a capacitor, reset means connected to the capacitor for charging said capacitor to a preselected first control voltage and operating said switch means to start the motor in the first stage and for charging said capacitor to a preselected second control voltage, said reset means comprising first and second rheostats, two of the terminals of said second rheostat being shunted between a first terminal and the terminal associated with the movable contact of said first rheostat through reversing means such that said terminals of said second rheostat may be reversed with respect to said terminals of said first rheostat, means to cause a continuous flow of current to said capacitor to attain a predetermined third voltage while mixing during said first stage is in progress and to cause a continuous flow of current to said capacitor to attain a predetermined fourth voltage while mixing during said second stage is in progress whereby there is a progressive change of voltage across said capacitor during each of said stages, a trigger circuit operative on attainment of said third voltage across said capacitor to operate said reversing means of said reset means at the end of said first stage and operative on attainment of said fourth voltage across said capacitor to operate said switch means to stop the motor at the end of said second stage.

References Cited

UNITED STATES PATENTS

| | | | |
|---|---|---|---|
| 2,579,163 | 12/1951 | Wald et al. | 317—142 |
| 2,785,346 | 3/1957 | Large | 317—142 |
| 2,818,532 | 12/1957 | Aitel | 317—142 X |
| 3,202,876 | 8/1965 | Mathews et al. | 317—142 X |

ORIS L. RADER, Primary Examiner

ALFRED G. COLLINS, Assistant Examiner

U.S. Cl. X.R.

318—453